US010755312B2

(12) United States Patent
Aist (10) Patent No.: US 10,755,312 B2
(45) Date of Patent: Aug. 25, 2020

(54) NAVIGATION SYSTEM WITH GEOCACHING MECHANISM AND METHOD OF OPERATION THEREOF

(71) Applicant: Telenav, Inc., Sunnyvale, CA (US)

(72) Inventor: Gregory Stewart Aist, San Mateo, CA (US)

(73) Assignee: Telenav, Inc., Santa Clara, CA (US)

( * ) Notice: Subject to any disclaimer, the term of this patent is extended or adjusted under 35 U.S.C. 154(b) by 1234 days.

(21) Appl. No.: 14/035,649

(22) Filed: Sep. 24, 2013

(65) Prior Publication Data

US 2015/0089158 A1 Mar. 26, 2015

(51) Int. Cl.
*G06Q 30/00* (2012.01)
*G06Q 30/02* (2012.01)

(52) U.S. Cl.
CPC ..... *G06Q 30/0267* (2013.01); *G06Q 30/0207* (2013.01); *G06Q 30/0261* (2013.01)

(58) Field of Classification Search
CPC .................................. G06Q 30/0207–30/0277
See application file for complete search history.

(56) References Cited

U.S. PATENT DOCUMENTS

| 9,965,768 | B1 * | 5/2018 | Doane ................ G06Q 30/0251 |
| 2008/0065488 | A1 * | 3/2008 | Schwagmann ........ G06Q 30/02 705/14.36 |
| 2009/0187563 | A1 * | 7/2009 | Chen ..................... G06Q 10/109 |
| 2009/0227374 | A1 * | 9/2009 | Tirpak ..................... A63F 13/12 463/40 |
| 2010/0079338 | A1 * | 4/2010 | Wooden ............. G06Q 30/0241 342/357.64 |

FOREIGN PATENT DOCUMENTS

| EP | 2397819 A1 * | 12/2011 | ............. G01C 21/36 |
| WO | WO-0170358 A2 * | 9/2001 | ............ A63F 13/216 |

OTHER PUBLICATIONS https://forums.geocaching.com/GC/index.php?/topic/265089-geocaching-for-marketing-purposes-how-to/, Dec. 9, 2010. (Year: 2010).*
https://en.wikipedia.org/w/index.php?title=Travel_Bug&oldid=416442805, Feb. 28, 2011. (Year: 2011).*
"Geocaching", "Geocaching 101", http://www.geocaching.com/guide/.

* cited by examiner

*Primary Examiner* — Michael Bekerman
(74) *Attorney, Agent, or Firm* — Perspectives Law Group, Corp.

(57) ABSTRACT

A method of operation of a navigation system includes: identifying a geocache at a geocache-location; determining an external association for representing the geocache associated with an entity, an event, or a combination thereof; determining an external status for identifying the external status of the entity, the event, or a combination thereof; and generating a cache status based on the external status for displaying on a device.

20 Claims, 5 Drawing Sheets

NAVIGATION SYSTEM WITH GEOCACHING MECHANISM AND METHOD OF OPERATION THEREOF

TECHNICAL FIELD

An embodiment of the present invention relates generally to a navigation system, and more particularly to a system with a geocaching mechanism.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is regarding use of locations of interest. The possible applications for combination of navigational capabilities and various locations of interest have not yet been fully utilized.

Thus, a need still remains for a navigation system with geocaching mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: identifying a geocache at a geocache-location; determining an external association for representing the geocache associated with an entity, an event, or a combination thereof; determining an external status for identifying the external status of the entity, the event, or a combination thereof; and generating a cache status based on the external status for displaying on a device.

An embodiment of the present invention provides a method of operation of a navigation system including: identifying a geocache at a geocache-location; determining an external association for representing the geocache associated with an entity, an event, or a combination thereof; determining an external status for identifying the external status of the entity, the event, or a combination thereof; generating a cache status based on the external status; and generating a completion reward based on the cache status for displaying on a device.

An embodiment of the present invention provides a navigation system, including: a cache identification module for identifying a geocache at a geocache-location; an association module, coupled to the cache identification module, for determining an external association for representing the geocache associated with an entity, an event, or a combination thereof; a remote status module, coupled to the association module, for determining an external status for identifying the external status of the entity, the event, or a combination thereof; and a cache update module, coupled to the remote status module, for generating a cache status based on the external status for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
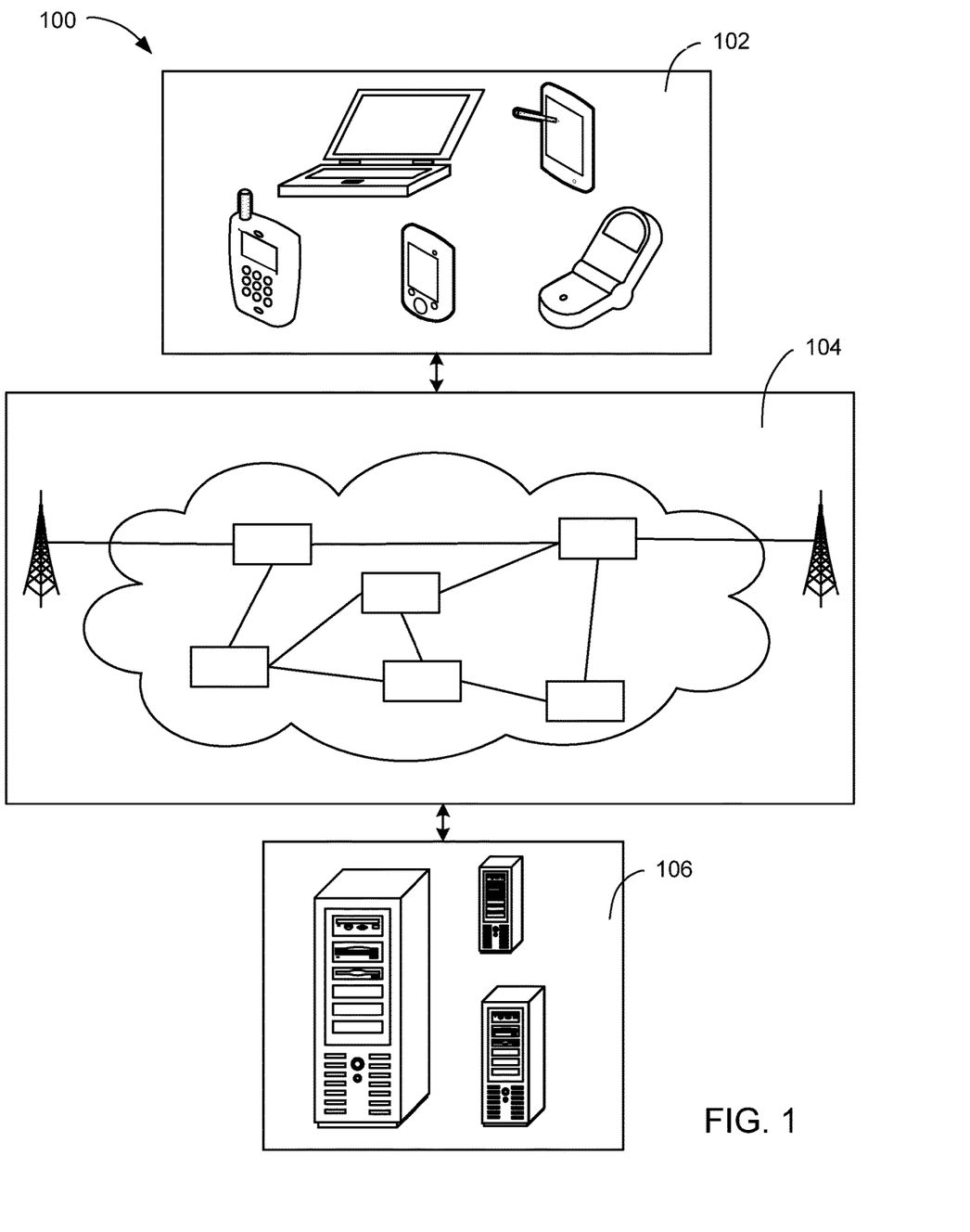
FIG. 1 is a navigation system with image conversion mechanism in an embodiment of the present invention.

Referring now to FIG. 1, therein is shown a navigation system 100 with anomaly detection mechanism in an embodiment of the present invention. The navigation system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, automotive telematics navigation system, or other multi-functional mobile communication or entertainment device. The first device 102 can couple, either directly or indirectly, to the communication path 104 to communicate with the second device 106 or can be a stand-alone device. The first device 102 further be separate form or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
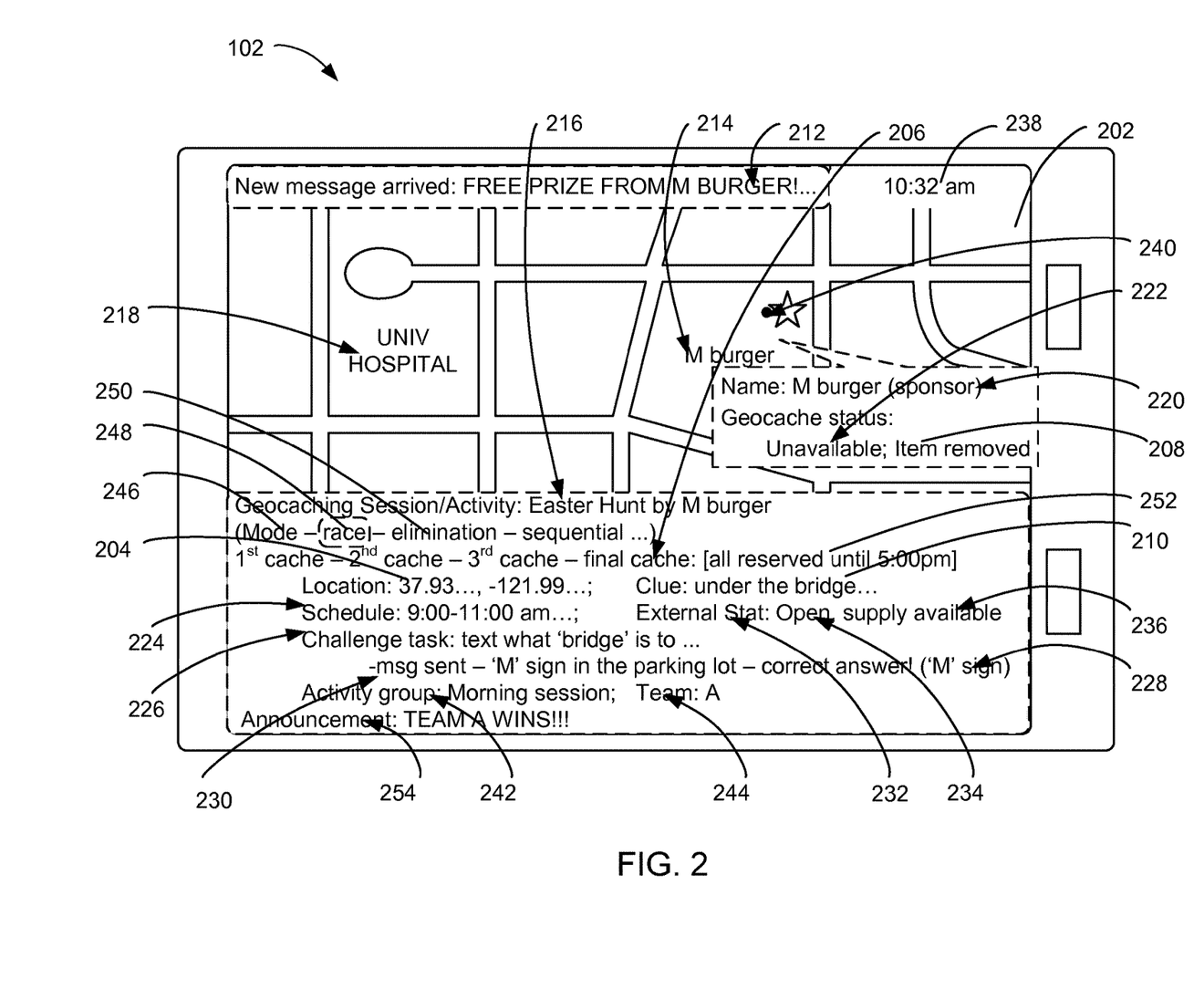
FIG. 2 is an example of a display interface of the first device.

Referring now to FIG. 2, therein is shown an example of a display interface 202 of the first device 102 of FIG. 1. The display interface 202 can show geocaching related information. For example, the display interface 202 can show a geocache-location 204 for a geocache 206 having an item status 208.

Geocaching is an activity where users use the navigation system 100 to hide or seek one or more items. Geocaching can be a recreational activity using a device or a component associated with a global positioning system (GPS). Geocaching can include hiding and seeking containers or items at or around a physical location.

The geocache 206 is the container, the item, or a combination thereof used as the goal of the activity. The geocache 206 can be the container, the item, or a combination thereof to be hidden or found during geocaching activity.

The geocache-location 204 is the physical location or a geographic area for the geocache 206. The geocache-location 204 can be the GPS coordinates for an area where the geocache 206 is hidden. For example, the geocache-location 204 can be the GPS coordinates determined by the first device 102 for the location where a user hid the geocache 206. Also for example, the geocache-location 204 can be an area likely corresponding to a specific set of coordinates based on the accuracy and the granularity of the first device 102 for a user seeking the geocache 206.

The geocache-location 204 can include a specific geographic location or a set of locations matching a condition. For example, the geocache-location 204 can include a specific location associated with a particular business entity, such as under a particular sign for a particular burger restaurant. Also for example, the geocache-location 204 can include a specific set of locations associated with one or more instances of an entity, such as under any main sign for a particular chain of burger restaurants. As a more specific example, the particular chain of burger restaurants can use the geocache 206 at the geocache-location 204 to conduct a promotion of giving away prizes, such as free toys or food coupons, to the first limited set of participants who check in under the main sign of the restaurant.

The item status 208 is information regarding the geocache 206 at the geocache-location 204. The item status 208 can include information representing existence of the item inside the container, time since last removal of item from the box, or a combination thereof. The item status 208 can be used to represent whether the user found the geocache 206, replaced the item, read or signed a log therein, or a combination thereof.

The navigation system 100 can include or interface with the geocache 206 having a sensor, a communication device, or a combination thereof. The item status 208 can be based on information from the sensor, the communication device, or a combination thereof for the geocache 206.

Geocaching can utilize a cache clue 210, a completion reward 212, or a combination thereof. The cache clue 210 is information for identifying the geocache 206, the geocache-location 204, or a combination thereof. For example, the cache clue 210 can be a song, a riddle, a phrase, set of numbers, or a combination thereof that can hint at the location, appearance, size, type, or a combination thereof for the geocache 206.

The completion reward 212 is an item, a notice, a proof, or a combination thereof related to successfully completing the geocaching activity. For example, the completion reward 212 can be an email notification, a code, a voucher, a coupon, the item previously in the container for the geocache 206, a physical item, or a combination thereof given to or obtained by the user based on the user finding the geocache 206, completing a related activity, a person related to the user finding the geocache 206 or completing a activity related therewith, or a combination thereof.

Geocaching can be associated with an entity 214, an event 216, or a combination thereof. The entity 214 is a unit regarding a person, a place, an organization, a grouping thereof, or a combination thereof having its own distinct existence or character.

The entity 214 can have a goal independent of or related to the geocaching activity. For example, the entity 214 can be a group or an organization organizing or planning the geocaching activity. Also for example, the entity 214 can be a business existing independent of the geocaching activity or supporting the geocaching activity, such as by providing the completion reward 212, supplying the cache clue 210, determining or providing the geocache-location 204, or a combination thereof.

The entity 214 can include a point of interest 218. The point of interest 218 can be a specific geographical location that a user may find useful or interesting. The point of interest 218 can be a location determined by the navigation system 100.

For example, the point of interest 218 can be predetermined based on one or more instances of the entity 214 existing at a location associated with or of interest to the user, such as a business or a residence, popularity of the location with other users, social significance associated with the location, such as historical sites or scenic points, or a combination thereof. Also for example, the point of interest 218 can be a commercial entity or location the user may have interest in visiting.

The event 216 is an organized occasion, occurrence, or a series thereof having a particular theme, purpose, activity, or a combination thereof. For example, the event 216 can include a sporting competition, a themed or purposed gathering or activity, a promotional activity, a discount sale, or a combination thereof.

The event 216 can be affiliated with the entity 214. For example, the event 216 can be affiliated with the entity 214 when the entity 214 plans, organizes, hosts, assists, funds, or a combination of actions thereof for the event 216.

The geocache 206 or the geocaching activity can have an external association 220 with the event 216, the entity 214, or a combination thereof. The external association 220 is a connection or a relationship between the geocaching activity and a separate unit, grouping, occurrence, or a combination thereof.

For example, the external association 220 can be the connection or the relationship between the event 216, the entity 214, or a combination thereof and the geocaching activity, the geocache 206, the completion reward 212, the cache clue 210, or a combination thereof.

As a more specific example, the external association can include the entity 214, the event 216, or a combination thereof suggesting or providing the geocache-location 204, providing the geocache 206, the completion reward 212, a portion thereof, or a combination thereof, providing or suggesting the cache clue 210, or a combination thereof. The external association 220 can be based on contractual relationship, sponsorship or promotional opportunity, or a combination thereof.

Geocaching can further involve a cache status 222, a cache schedule 224, a challenge task 226, or a combination thereof. The cache status 222 is a state describing the geocache 206, the completion reward 212, or a combination thereof for the geocaching activity. The cache status 222 can be a current state or a state at a corresponding time. For example, the cache status 222 can include an availability of the geocache 206, the completion reward 212, or a combination thereof for the geocaching activity, the item status 208 for representing when the geocache 206 was last found or accessed by any user, or a combination thereof.

As a more specific example, the cache status 222 can indicate that the geocache 206 is available for a specific session of the geocaching activity, or indicate that the geocache 206 has been reserved or is being used for a different session of the geocaching activity by a different user and thus unavailable to the user. As a further specific example, the cache status 222 can indicate that the geocache 206 has been found during the specific session of the geocaching activity.

The cache schedule 224 is a time-based limitation or condition indicating different values of the cache status 222 according to date and time. The cache schedule 224 can include a time-related condition or constraint, such as sunrise or low tide, a specific time, such as a calendar or a timetable, or a combination thereof.

For example, the cache schedule 224 can indicate when the geocache 206 is reserved or unavailable. Also for example, the cache schedule can indicate when the completion reward 212 associated with the event 216, the entity 214, or a combination thereof, such as a code or a coupon, is available or redeemable.

As a more specific example, the cache schedule 224 can be used to conduct a scavenger-hunt type of activity or promotion. The cache schedule 224 can indicate the geocache 206 reserved between sunrise and sunset. As a further specific example, the cache schedule can indicate availability of the completion reward 212 after low tide for finding an item or taking a picture during the low tide condition to fulfill a requirement of the scavenger-hunt type of activity.

The challenge task 226 is an action or circumstance required in addition to accessing the geocache 206 for the navigation system 100 to distribute or enable the completion reward 212. For example, the challenge task 226 can be a requirement to access the geocache 206 within a specified duration, such as within a specific amount of time from signing up, based on the operating time of the entity 214, based on the time of the event 216, or a combination thereof.

Also for example, the challenge task 226 can be a requirement to be within a set number of users first to access or find the geocache 206, a set of actions, such as taking and submitting a specific picture or repeating a specific phrase when presenting the completion reward 212, or a combination thereof. For further example, the challenge task 226 can be a requirement to access multiple instances of the geocache 206 in a specific sequence.

The challenge task 226 can include a challenge detail 228. The challenge detail 228 is a threshold, a range, a requirement for data, or a combination thereof for verifying satisfaction of the challenge task 226. For example, the challenge detail 228 can be a verification of an uploaded image or a content of the uploaded image, verification of an uploaded sound file or a content therein, a time range for accessing the geocache 206, an order of locations or a sequence of access for multiple instances of the geocache 206, or a combination thereof.

The navigation system 100 can compare a task completion proof 230 from the user to the challenge detail 228. The task completion proof 230 is data associated with the user in performing the challenge task 226. The task completion proof 230 can be the data describing the user performing or completing the challenge task 226. The navigation system 100 can generate the completion reward 212, the cache status 222, or a combination thereof when the task completion proof 230 is within or matches the challenge detail 228.

The cache status 222, the cache schedule 224, the challenge task 226, or a combination thereof can be based on an external status 232. The external status 232 is a state describing the entity 214, the event 216, or a combination thereof in relation to the geocaching activity. The external status 232 can be a current state or a state for a corresponding time for an aspect of the event 216, the entity 214, or a combination thereof.

For example, the external status 232 can indicate current availability of supplies for generating, distributing, redeeming, or a combination thereof for the completion reward 212. Also for example, the external status 232 can be based on the duration of the promotion event or sponsorship related to the geocaching activity.

The external status 232 can include a temporal status 234, a supply status 236, or a combination thereof. The temporal status 234 is a time limitation associated with the external status 232. For example, the temporal status 234 can be the dates or duration for the sponsorship or advertising event where the entity 214, the event 216, or a combination thereof is related to the completion reward 212.

The supply status 236 is a state of resource controlled by the entity 214, the event 216, or a combination thereof associated with the geocaching activity. The supply status 236 can indicate availability or validity of the completion reward 212 associated with the event 216 or the entity 214. For example, the supply status 236 can indicate the availability or the remaining quantity of prizes at the event 216 or the entity 214 offered as the completion reward 212. Also for example, the supply status 236 can indicate the validity or the remaining duration for the coupon applicable to the event 216 or the entity 214 and offered as the completion reward 212.

The navigation system 100 can further display a current time 238, a current location 240, an activity group 242, an activity team 244, or a combination thereof. The current time 238 can be represented using year, month, date, hour, minute, second, or a combination thereof. The current location 240 can represent the location of the user, the first device 102, or a combination thereof.

The current location 240 can be represented with navigation information, including latitude-longitude or GPS coordinates, address, cross streets, or a combination thereof. The current location 240 can further be represented with relevant information, such as information related to the point of interest 218, the entity 214, the event 216, or a combination thereof.

The activity group 242 is a specific grouping of users participating in a specific instance of the geocaching activity. The activity group 242 can be based on a reservation, a notice, an assignment or organization by the entity 214 or people organizing the event 216, or a combination thereof. For example, the activity group 242 can be a set of contestants or a group of people using the navigation system 100 to collectively participate in the same instance of geocaching activity.

The activity team 244 is a subset of grouping within the activity group 242 for the geocaching activity. For example, the activity group 242 can be divided into two or more instances of the activity team 244 to see who can complete their goals faster based on the geocache 206, the cache schedule 224, the cache clue 210, the challenge task 226, or a combination thereof.

The navigation system 100 can further include a geocache mode 246 for accommodating various modes. The geocache mode 246 is a collection of settings, processes, or a combination thereof for accommodating the geocaching activity. For example, the geocache mode 246 can accommodate a single user differently than the activity group 242 with many users.

Also, for example, the geocache mode 246 can include a race mode 248, an elimination mode 250, or a combination thereof. The race mode 248 is a collection of settings, processes, or a combination thereof for accommodating a competitive instance of the geocaching activity for the activity group 242 with the instances of the activity team 244 attempting to complete the objectives of the geocaching activity first. The navigation system 100 can track, display, notify, or a combination thereof for the geocache 206, the activity team 244, or a combination thereof.

The elimination mode 250 is a collection of settings, processes, or a combination thereof for accommodating a different competitive instance of the geocaching activity with the instances of the activity team 244 attempting to access as many instances of the geocache 206 first. The navigation system 100 can display, notify, or a combination thereof for the progress and further disable the geocache 206 from the geocaching activity after one person or team has accessed the geocache 206. The navigation system 100 can determine the winner as the person or the activity team 244 having accessed the most instances of the geocache 206 first.

For further example, the geocache mode 246 can include a geocache reservation 252. The geocache reservation 252 is a collection of settings, processes, or a combination thereof for limiting access for one or more instances of the geocache 206 according to the geocaching activity.

The navigation system 100 can take reservations for a single user or a group of users, and generate the cache status 222, the completion reward 212 based on the geocache reservation 252. The navigation system 100 can further facilitate the geocaching activity by tracking the progress based on time and location of the users, the item status 208, the cache status 222, the cache schedule 224, the task completion proof 230, or a combination thereof. The navigation system 100 can generate a cache announcement 254 to notify the single user or the activity group 242 regarding the progress of the geocaching activity.

The navigation system 100 can generate the cache status 222 based on the geocache reservation 252, the progress of the geocaching activity, the external status 232, the cache schedule 224, the item status 208, or a combination thereof. The navigation system 100 can generate the cache status 222 based on the event 216, the entity 214, or a combination thereof.

The navigation system 100 can further generate the completion reward 212 based on the geocache reservation 252, the progress of the geocaching activity, the external status 232, the cache schedule 224, the item status 208, or a combination thereof. The navigation system 100 can generate the completion reward 212 based on the event 216, the entity 214, or a combination thereof. Details regarding the operation of the navigation system 100 will be described below.

Figure 3:
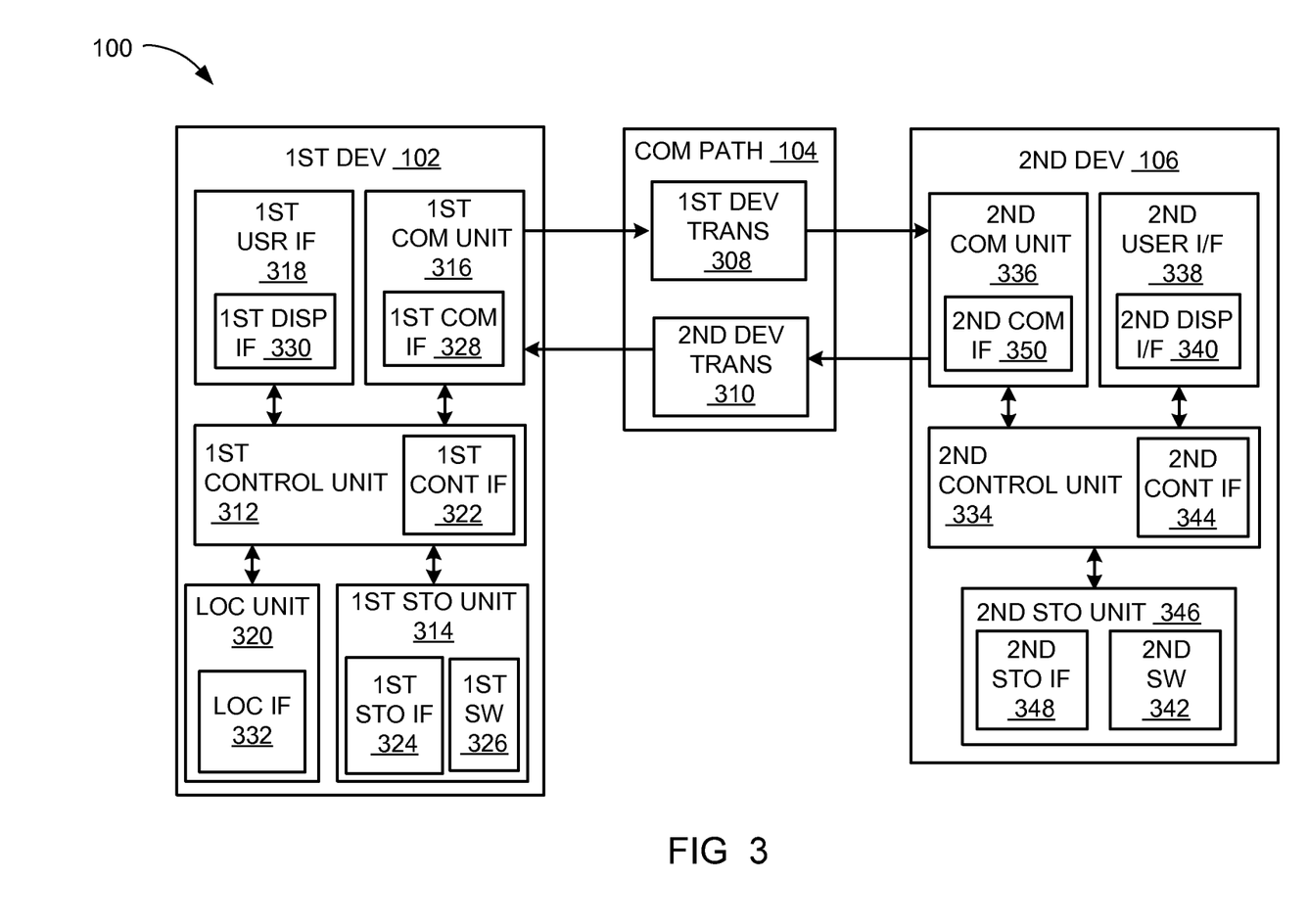
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318, and a location unit 320. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the first storage unit 314 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a desktop computer, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device, such as the display interface 202 of FIG. 2. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The location unit 320 can generate location information, current heading, current acceleration, and current speed of the first device 102, as examples. The location unit 320 can be implemented in many ways. For example, the location unit 320 can function as at least a part of the global positioning system, an inertial navigation system, a cellular-tower location system, a pressure location system, or any combination thereof. Also, for example, the location unit 620 can utilize components such as an accelerometer or GPS receiver.

The location unit 320 can include a location interface 332. The location interface 332 can be used for communication between the location unit 320 and other functional units in the first device 102. The location interface 632 can also be used for communication external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control unit 312.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, a second user interface 338, and a second storage unit 346.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the second storage unit 346 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 4:
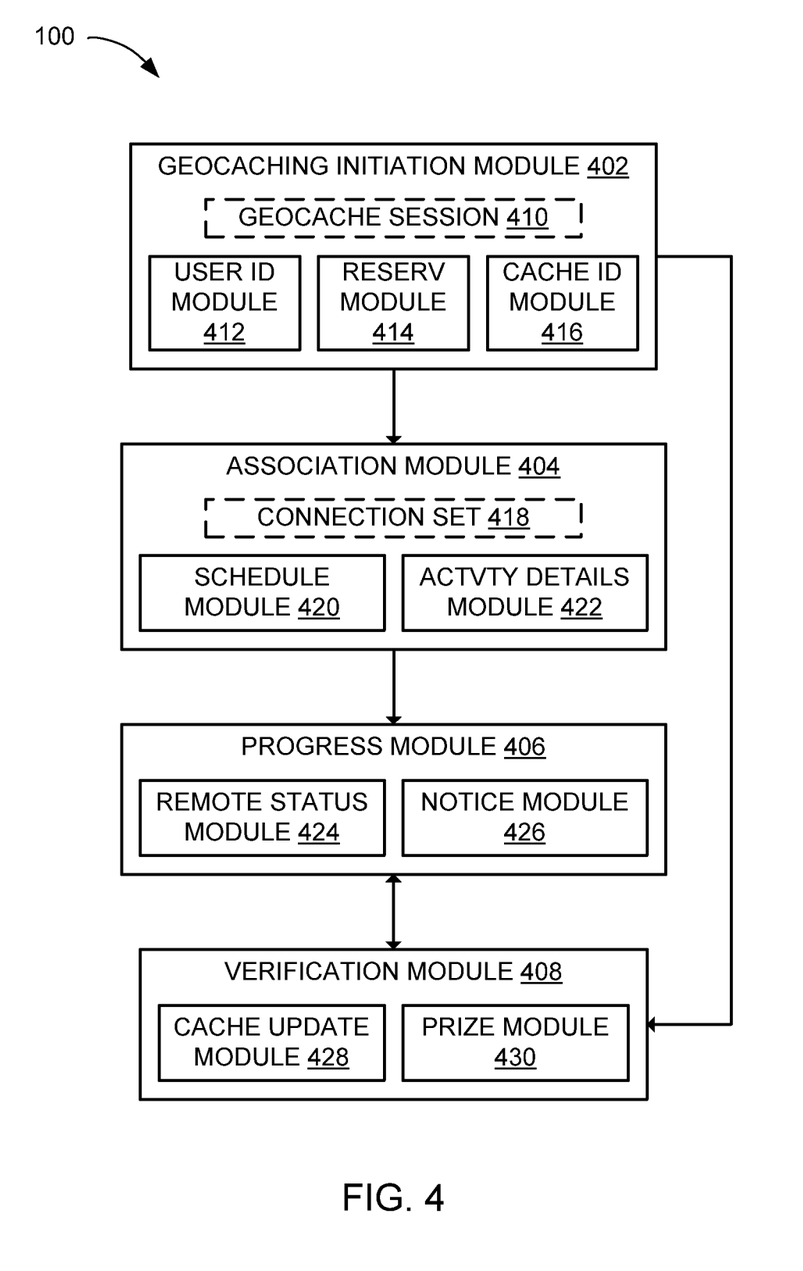
FIG. 4 is a control flow of the navigation system.

Referring now to FIG. 4, therein is shown a control flow of the navigation system 100. The navigation system 100 can include a geocaching initiation module 402, an association module 404, a progress module 406, and a verification module 408.

The geocaching initiation module 402 can be coupled to the association module 404, the verification module 408, or a combination thereof using wired or wireless connections, by having an output of one module as an input of the other module, by having operations of one module influence operation of the other module, or a combination thereof. Similarly, the association module 404 can be coupled the progress module 406, and the progress module 406 can be further coupled to the verification module 408.

The geocaching initiation module 402 is for organizing the geocaching activity. The geocaching initiation module 402 can organize the geocaching activity by identifying one or more users, identifying a reservation associated with the activity, determining settings for facilitating the activity, identifying the geocache 206 of FIG. 2 associated with the activity, or a combination thereof.

The geocaching initiation module 402 can generate a geocache session 410. The geocache session 410 is data representing a specific instance of the geocaching activity. The geocache session 410 can correspond to a specific set of time, location, instances of the geocache 206, user or a group of users, or a combination thereof.

The geocaching initiation module 402 can generate the geocache session 410 based on data received or acquired with the first user interface 318 of FIG. 3, the second user interface 338 of FIG. 3, the first communication unit 316 of FIG. 3, the second communication unit 336 of FIG. 3, or a combination thereof. For example, the geocaching initiation module 402 can use inputs from a user, the entity 214 of FIG. 2, organizers of the event 216 of FIG. 2, or a combination thereof for starting an instance of the geocaching activity, selecting or accessing the geocache 206, reserving an instance of the geocaching activity or the geocache 206, or a combination thereof. Details regarding the reservation will be discussed below.

The geocaching initiation module 402 can include a user identification module 412, a reservation module 414, a cache identification module 416, or a combination thereof for organizing the geocaching activity. The user identification module 412 is for identifying one or more users, participants, or a combination thereof for the geocaching activity. The user identification module 412 can identify the user, the activity group 242 of FIG. 2, the activity team 244 of FIG. 2, or a combination thereof.

For example, the user identification module 412 can use the first user interface 318, the second user interface 338, the first communication unit 316, the second communication unit 336, or a combination thereof to identify a user or a participant through inputs from the user, the navigation system 100, the entity 214, the organizer of the event 216, or a combination thereof. Also for example, the user identification module 412 can use the first control unit 312 of FIG. 3, the second control unit 334 of FIG. 3, the location unit 320 of FIG. 3, or a combination thereof to identify the user or the participant using navigation information and relevant data based on the geocache-location 204 of FIG. 2.

For further example, the user identification module 412 can identify multiple users or participants in the activity group 242 based on predetermined settings, such as the geocache reservation 252 of FIG. 2, user inputs and selections, or a combination thereof. The individual identifications can be based on the navigation information of the location unit 320, the communication information, such as telephone number or device identification information, other stored identification information, such as login information or membership information, or a combination thereof for the first device 102 of FIG. 1 associated with each individual users.

The user identification module 412 can include the user identification, the activity group 242, the activity team 244, or a combination thereof in the geocache session 410. The user identification module 412 can further store the geocache session 410 in the first storage unit 314 of FIG. 3, the second storage unit 346 of FIG. 3, or a combination thereof.

The reservation module 414 is for generating and identifying the reservation associated with the geocaching activity. The reservation module 414 can generate the geocache reservation 252. The reservation module 414 can generate the geocache reservation 252 based on inputs from the user, the navigation system 100, the entity 214, organizer of the event 216, or a combination thereof.

The reservation module 414 can store the geocache reservation 252 in the first storage unit 314, the second storage unit 346, or a combination thereof. The reservation module 414 can also generate the geocache session 410 including the geocache reservation 252, and store the geocache session 410 including the geocache reservation 252 in the first storage unit 314, the second storage unit 346, or a combination thereof.

The reservation module 414 can further identify the reservation associated with the geocaching activity. The reservation module 414 can identify the reservation by identifying the geocache reservation 252. The reservation module 414 can identify the geocache reservation 252 for accommodating the geocache 206 for the activity group 242. The reservation module 414 can identify the geocache reservation 252 based on searching reservations having the one or more user identification stored in the geocache session 410, reservation identification supplied by the user, the navigation system 100, the entity 214, the organizer of the event 216, or a combination thereof.

The navigation system 100 can generate the cache status 222 of FIG. 2 based on the geocache reservation 252. Details regarding the cache status 222 will be discussed below.

The reservation module 414 can further update the geocache session 410 to include the relationship to the geocache reservation 252. The reservation module 414 can use the first control unit 312, the second control unit 334, or a combination thereof to search, identify, and update for the geocache reservation 252. The reservation module 414 can update the geocache session 410 stored in the first storage unit 314, the second storage unit 346, or a combination thereof based on identifying the geocache reservation 252.

The cache identification module 416 is for identifying the geocache 206 associated with the activity. The cache identification module 416 can identify the geocache 206, the geocache-location 204, or a combination thereof corresponding to the geocaching activity. For example, the cache identification module 416 can identify the geocache 206, the geocache-location 204, or a combination thereof based on selection information, the geocache reservation 252, or a combination thereof as described above.

As a more specific example, the user, the entity 214, the organizer of the event 216, or a combination thereof can select the geocache-location 204, the geocache 206, or a combination thereof for reservation or for the geocaching activity. The cache identification module 416 can identify the geocache 206 by determining the identification information of the geocache 206, the geocache-location 204 associated with the geocache 206, or a combination thereof.

The cache identification module 416 can further identify the geocache 206 based on the geocache-location 204 by determining the identification information of the geocache 206 associated with the geocache-location 204. The cache identification module 416 can further identify the geocache 206 based on the geocache reservation 252, the geocache mode 246 of FIG. 2, or a combination thereof.

For example, the cache identification module 416 can determine the identification information for one or more instances of the geocache 206 previously reserved, grouped, associated with the geocache session 410, or a combination thereof by the user, the entity 214, the organizer of the event 216, or a combination thereof. Also for example, the cache identification module 416 can determine the identification information for one or more instances of the geocache 206 appropriate for the race mode 248 of FIG. 2, the elimination mode 250 of FIG. 2, or a combination thereof.

The cache identification module 416 can update the geocache session 410 to include the identification information for the appropriate instance of the geocache 206, the associated instance of the geocache-location 204, or a combination thereof. The cache identification module 416 can store the geocache session 410 using the first storage unit 314, the second storage unit 346, or a combination thereof.

After organizing the geocaching activity, the control flow can pass from the geocaching initiation module 402 to the association module 404. The control flow can pass by having the geocache session 410, the geocache 206, the geocache-location 204, user information, or a combination thereof as an output from the geocaching initiation module 402 to an input of the association module, storing the geocache session 410, the geocache 206, the geocache-location 204, user information, or a combination thereof at a location known and accessible to the association module 404, by notifying the association module 404, such as by using a flag, an interrupt, a status signal, or a combination thereof, or a combination of processes thereof.

The association module 404 is for determining a relationship between the geocaching activity and any instance of the entity 214, the event 216, or a combination thereof. The association module 404 can determine the relationship by determining the external association 220 of FIG. 2 for representing the geocache 206 associated with the entity 214, the event 216, or a combination thereof.

The navigation system 100 can include a connection set 418. The connection set 418 is a record of all associations between instances of the geocache 206 and corresponding instances of the entity 214, the event 216, or a combination thereof. The connection set 418 can include all instances of the external association 220 for the navigation system 100. For example, the connection set 418 can include the predetermined list of sponsors, advertisers, participating groups, or a combination thereof corresponding to instances of the geocache 206.

The association module 404 can generate and maintain the connection set 418 based on based on contractual relationship, sponsorship or promotional opportunity, or a combination thereof. Further, the association module 404 can determine the external association 220 by searching the connection set 418 based on the geocache 206 and determining the entity 214, the event 216, or a combination thereof associated with the geocache 206 in the connection set 418.

The association module 404 can have the connection set 418 in the first storage unit 314, the second storage unit 346, or a combination thereof. The association module 404 can update the connection set 418 using the first control interface 322 of FIG. 3, the second control interface 344 of FIG. 3, the first storage interface 324 of FIG. 3, the second storage interface 348 of FIG. 3, or a combination thereof. The association module 404 can determine the external association 220 from the connection set 418 using the first control unit 312, the second control unit 334, or a combination thereof.

The association module 404 can include a schedule module 420, an activity details module 422, or a combination thereof. The schedule module 420 is for determining the cache schedule 224 of FIG. 2 for temporally controlling the cache status 222 of FIG. 2.

The schedule module 420 can determine the cache schedule 224 based on the entity 214, the event 216, or a combination thereof. For example, the schedule module 420 can determine the cache schedule 224 based on or coinciding with an operation time of the entity 214, a duration of the event 216, such as daily hours or dates for the event 216, or a combination thereof.

The schedule module 420 can further determine the cache schedule 224 based on other schedules associated with the entity 214, the event 216, or a combination thereof. For example, the schedule module 420 can determine the cache schedule 224 based on or coinciding with a shipment schedule, such as for supplies or ingredients, for the entity 214 or the event 216, projected completion dates for intermediate requirements for the entity 214 or the event 216, or a combination thereof.

The schedule module 420 can determine the cache schedule 224 using the first user interface 318, the second user interface 338, the first communication unit 316, the second communication unit 336, or a combination thereof. For example, the schedule module 420 can use the first user interface 318, the second user interface 338, or a combination thereof to receive scheduling information from the entity 214, the organizers of the event 216, the navigation system 100, or a combination thereof. Also for example, the schedule module 420 can use the first communication unit 316, the second communication unit 336, or a combination thereof to search operations hours, event duration, other associated schedules, or a combination thereof.

The activity details module 422 is for determining settings for facilitating the activity. The activity details module 422 can identify the cache clue 210 of FIG. 2, identify the geocache mode 246, identify the challenge task 226 of FIG. 2, or a combination thereof.

The activity details module 422 can identify the cache clue 210 based on predetermined information associated with the geocache 206. The cache clue 210 can be predetermined and specifically associated with the geocache 206 by the navigation system 100, the entity 214, the organizer of the event 216, or a combination thereof. The activity details module 422 can further use the first user interface 318, the second user interface 338, the first communication unit 316, the second communication unit 336, or a combination thereof to receive the cache clue 210 from the entity 214, the organizer of the event 216, or a combination thereof.

The activity details module 422 can identify the geocache mode 246 in a variety of ways. For example, the activity details module 422 identify the geocache mode 246 based on selection information using the first user interface 318, the second user interface 338, the first communication unit 316, the second communication unit 336, or a combination thereof as described above.

Also for example, the activity details module 422 can identify the geocache mode 246 based on the geocache reservation 252. The activity details module 422 can update the geocache session 410 stored in the first storage unit 314, the second storage unit 346, or a combination thereof based on determining the geocache mode 246.

The activity details module 422 can identify the geocache mode 246 for accommodating the geocache 206 for the activity group 242. The activity details module 422 can accommodate the geocache 206 for the activity group 242 by configuring the navigation system 100, the geocache 206, the first device 102 of FIG. 1, or a combination thereof according to the geocache mode 246. For example, the activity details module 422 can configure the first control unit 312, the second control unit 334, or a combination thereof for accommodating the race mode 248 of FIG. 2 or the elimination mode 250 of FIG. 2.

Also for example, the activity details module 422 can control the information displayed on the first display interface 330 of FIG. 3, the second display interface 340 of FIG. 3, or a combination thereof. The activity details module 422 can display different information based on the geocache mode 246 for accommodating the activity group 242.

As a specific example, the activity details module 422 can display and update the cache status 222, the item status 208 of FIG. 2, or a combination thereof for the elimination mode 250. As a further example, the activity details module 422 can display instances of the current location 240 of FIG. 2 for all instances of the activity team 244 for the race mode 248.

The activity details module 422 can further identify the challenge task 226 associated with the geocache 206. The connection set 418 can further include various actions or circumstances required for achieving or completing the goals in addition to finding or accessing the geocache 206. The connection set 418 can have the various actions or circumstances, or multiple instances of the challenge task 226, each associated with one or more instances of the geocache 206. The connection set 418 or the challenge task 226 therein can be supplied or predetermined by the entity 214, the organizer of the event 216, the navigation system 100, or a combination thereof.

For example, the connection set 418 can have the challenge task 226 as removing a flag from the first geocache and placing the flag in the last geocache for the race mode 248. Also for example, the connection set 418 can have the challenge task 226 of taking a digital image of a specific instance of the geocache 206 and uploading the image after finding the specific instance of the geocache 206.

The activity details module 422 can identify the challenge task 226 associated with the geocache 206 by identifying one or more instances of the geocache 206 related to the geocache session 410. The activity details module 422 can use the first control interface 322, the second control interface 344, the first storage interface 348, the second storage interface 324, or a combination thereof to access the connection set 418 and identify the action, the condition, the requirement or restriction, or a combination thereof associated with the geocache 206. The activity details module 422 can identify the challenge task 226 as the action, the condition, the requirement or restriction, or a combination thereof associated with the geocache 206.

The activity details module 422 can further identify the challenge task 226 associated with the geocache 206 by receiving the action, the condition, the requirement or restriction, or a combination thereof associated with the geocache 206 from the entity 214, the organizer of the event 216 or a combination thereof. The activity details module 422 can receive the action, the condition, the requirement or restriction, or a combination thereof using the first user interface 318, the second user interface 338, the first communication unit 316, the second communication unit 336, or a combination thereof.

After determining the relationships and other related information, the control flow can pass from the association module 404 to the progress module 406. The control flow can pass similarly as described above between the geocaching initiation module 402 and the association module 404.

The progress module 406 is for controlling the navigation system 100 or the devices therein during the geocaching activity for accommodating the geocaching activity. For example, the progress module 406 can display coordinates for the geocache-location 204, communicate any notices associated with the geocaching activity, information related to the progress or the completion reward 212 of FIG. 2, any related external information, or a combination thereof. The progress module 406 can include a remote status module 424, a notice module 426, or a combination thereof for controlling the navigation system 100 or the devices therein.

The remote status module 424 is for determining the external status 232 of FIG. 2. The remote status module 424 can determine the external status for identifying a status of the entity 214, the event 216, or a combination thereof related to the geocaching activity. The remote status module 424 can use the first user interface 318, the second user interface 338, the first communication unit 316, the second communication unit 336, or a combination thereof for determining the external status 232 based on receiving information from the entity 214, the organizers of the event 216, or a combination thereof.

For example, the remote status module 424 can be coupled to the inventory device, point of sale device, scheduling application, messaging application, or a combination thereof at the entity 214, the event 216, or a combination thereof. As a more specific example, the remote status module 424 can receive or determine operating hours or scheduling information for the entity 214 or the event 216, inventory information or shipping schedule for the completion reward 212, or a combination thereof from the entity 214, the event 216, or a combination thereof.

The remote status module 424 can determine the external status 232 as the received or determined information. The remote status module 424 can further determine the external status 232 based on the received or determined information. For example, the remote status module 424 can determine the external status 232 as being unavailable based on comparing the operational hours and the current time 238 of FIG. 2. Also for example, the remote status module 424 can determine the external status 232 as being available based on a projected time for finishing the geocaching activity, and the inventory information or the shipping schedule.

The navigation system 100 can generate the cache status 222 based on the external status 232. Details regarding the cache status 222 will be discussed below.

The notice module 426 is for communicating information relevant to the geocaching activity to the user, the activity group 242, or a combination thereof. The notice module 426 can communicate the relevant information by generating the cache announcement 254 of FIG. 2. The notice module 426 can communicate by using the first user interface 318, the second user interface 338, or a combination thereof to display images, generate sounds, or a combination thereof.

The notice module 426 can communicate various types of communications to the user, the activity team 244, the activity group 242, or a combination thereof. For example, the notice module* can communicate messages or statuses regarding availability of the completion reward 212, changes in the item status 208 or the external status 232, other progress related information, beginning or ending of the geocaching session, feedback regarding the task completion proof 230 of FIG. 2, or a combination thereof.

As a more specific example, the notice module 426 can generate the cache announcement 254 based on the cache status 222. The notice module 426 can generate the cache announcement 254 when the cache status 222 changes based on accessing the geocache 206 and the geocache mode 246, based on accessing the geocache 206 with or without the geocache reservation 252 during the duration of the reserved time period, based on accessing the geocache 206 along with the external status 232 or the cache schedule 224, or a combination thereof.

The notice module 426 can further generate the cache announcement 254 for notifying only the activity group 242 or only the activity team 244. The notice module 426 can generate the cache announcement 254 based on the geocache session 410, the geocache mode 246, or a combination thereof. For example, the notice module 426 can generate the cache announcement 254 regarding progress of the game for all members in the activity group 242 for the race mode 248. Also for example, the notice module 426 can generate the cache announcement 254 regarding progress of the game for members within the activity team 244 for the elimination mode 250.

After or while controlling the navigation system 100 for accommodating the geocaching activity the control flow can pass from the progress module 406 to the verification module 408. The control flow can pass similarly as described above between the geocaching initiation module 402 and the association module 404. The control flow can pass based on detected events, such as accessing the geocache 206, the current location 240 overlapping a predetermined coordinate, receiving the task completion proof 230, or a combination thereof.

The verification module 408 is for assessing the progress of the geocaching activity. The verification module 408 can assess the progress by determining satisfaction of the game objective. For example, the verification module 408 can determine accessing or finding of the geocache 206, completion of the challenge task 226, arrival of one or more user at a designated finish location, or a combination thereof.

The verification module 408 can identify the task completion proof 230 by receiving information corresponding to the challenge detail 228 of FIG. 2 from the user. For example, the verification module 408 can use the first user interface 318, the second user interface 338, the first communication unit 316, the second communication unit 336, or a combination thereof to receive data, such as images, navigation information, sound files, text, or a combination thereof. The verification module 408 can further identify the task completion proof 230 as the received data when the received data is within accepted ranges as defined by the challenge detail 228.

The verification module 408 can include a cache update module 428, a prize module 430, or a combination thereof for further processing based on determining satisfaction of the game objective. The cache update module 428 is for generating the cache status 222. The cache update module 428 can generate the cache status 222 according to a determination of whether the geocache 206 is available based on the context of the inquiry or the user.

The cache update module 428 can generate the cache status 222 based on the external status 232, the cache schedule 224, the geocache mode 246, the geocache reservation 252, the item status 208, the navigation information, the current location 240, the current time 238, or a combination thereof. The cache update module 428 can generate the cache status 222 by using the first control unit 312, the second control unit 334, or a combination thereof to evaluate the availability of the geocache 206, communicating the cache status 222, or a combination thereof based on such factors.

For example, the cache update module 428 can generate the cache status 222 based on the external status 232. The cache update module 428 can evaluate the availability or the validity of the geocache 206, the completion reward 212, or a combination thereof according to the external status 232. As a more specific example, the cache update module 428 can evaluate the geocache 206 as being valid or the completion reward 212 as being available when the supply status 236 of FIG. 2, the temporal status 234 of FIG. 2, or a combination thereof indicates sufficient supplies for the completion reward 212 or valid time period for offering the completion reward 212.

Also for example, the cache update module 428 can generate the cache status 222 based on the cache schedule 224. The cache update module 428 can evaluate the availability or the validity of the geocache 206, the completion reward 212, or a combination thereof according to the cache schedule 224. The cache update module 428 can evaluate the availability or the validity by comparing the current time 238 or the time corresponding to a proposed reservation time to the cache schedule 224.

For further example, the cache update module 428 can generate the cache status 222 based on the geocache mode 246. The cache update module 428 can generate the cache status 222 for accommodating the geocache mode 246 by generating messages or contents specific to the activity group 242 or the activity team 244. The cache update module 428 can further generate the cache status 222 by communicating the cache status 222 specifically for designated users according to the geocache mode 246, which will be discussed in further detail below.

For further example, the cache update module 428 can generate the cache status 222 based on the geocache mode 246, the item status 208, the task completion proof 230, navigational information of the user, or a combination thereof. The cache update module 428 can determine that an objective associated with the geocache 206 has been completed, and thus the geocache 206 becoming unavailable for the corresponding instance of the geocaching activity, based on geocache mode 246, the item status 208, the task completion proof 230, navigational information of the user, or a combination thereof.

For further example, the cache update module 428 can generate the cache status 222 based on the geocache reservation 252. The cache update module 428 can generate the cache status 222 for displaying the cache status 222 separately for the activity group 242.

As a more specific example, the reservation module 414 can evaluate the cache status 222 as being available only to the user associated with the geocache reservation 252 during the time associated with therewith. Also as a more specific example, the reservation module 414 can evaluate the cache status 222 as being available to any user outside of the time period associated with the geocache reservation 252.

The cache update module 428 can further generate the cache status 222 by communicating the cache status 222 to one or more user. For example the cache update module 428 can display the cache status 222, update the cache status 222, create sounds according to the cache status 222, or a combination thereof. The cache update module 428 can communicate the cache status 222 using the first user interface 318, the second user interface 338, or a combination thereof.

The cache update module 428 can generate the cache status 222 for the activity group 242, the activity team 244, one user, or a combination thereof. The cache update module 428 can generate the cache status 222 for a limited user by communicating the cache status 222 based on the geocache session 410, the geocache mode 246, or a combination thereof.

For example, the cache update module 428 can communicate the cache status 222 to only the devices belonging to the users as identified by the geocache session 410. Also for example, the cache update module 428 can include settings predetermined by the navigation system 100 for communicating the cache status 222 to only the activity team 244 or a single user. As a more specific example, the cache status 222 can be updated for the activity team 244 when a member of the activity team 244 accesses the corresponding instance of the geocache 206.

The reservation module 414 can generate the cache status 222 for notifying the user, other participants, separate users, or a combination thereof regarding the geocache reservation 252. For example, the cache status 222 can indicate that the geocache 206 as unavailable, reserved, or a combination thereof. Also for example, the reservation module 414 can notify the people accessing the geocache 206 that the accessed instance of the geocache 206 has been reserved by the activity group 242. The reservation module 414 can notify based on changing display format, such as outline or color, using visual or audible messages, or a combination thereof.

It has been discovered that the cache status 222 based on the external status 232 provides real-time interactions and updates between the entity 214, the organizer of the event 216, the navigation system 100, and the user. The external status 232 can be used to link the various parties and provide updates for information relevant to the user, such as the availability or the validity of the completion reward 212.

It has also been discovered that the cache status 222 based on the geocache reservation 252 provides organizational structure and other gaming possibilities. The cache status 222 based on the geocache reservation 252 allows parties to know the contextual usage of the geocache 206 before and during the geocaching activity, which can be used to convey reservation information to others. The reservation of the geocache 206 can further be used to develop other gaming ideas and gaming applications for groups as described above, without interference from other users.

It has further been discovered that the cache status 222 based on the geocache mode 246, the geocache session 410, and the cache announcement 254 provides additional and new gaming opportunities including the race mode 248 and the elimination mode 250. The cache status 222 can be used to communicate different information for conducting different types of gaming activities for the activity group 242.

It has been further discovered that the cache status 222 based on the challenge detail 228 and the task completion proof 230 provides additional complexities for the geocaching activity. The cache status 222 and the challenge detail 228 can be used to add additional requirements. The additional requirements can be contextual or personal to provide thematic and relevant experiences for the partaking group. Further, the additional requirements can be used to adjust difficulties of the geocaching activity or specifically for the activity team 244.

The prize module 430 is for generating the completion reward 212. The prize module 430 can generate the completion reward 212 when the verification module 408, the cache update module 428, or a combination thereof determines that the objectives of the geocaching activity, such as accessing the geocache 206, meeting the challenge task 226 with the task completion proof 230, or a combination thereof has been fulfilled.

For example, the prize module 430 can generate the completion reward 212 based on the external status 232, the cache schedule 224, the geocache mode 246, the geocache reservation 252, the item status 208, the navigation information, the current location 240, the current time 238, or a combination thereof as described above. Also for example the prize module 430 can generate the completion reward 212 based on values assigned to the cache status 222.

The prize module 430 can further generate the completion reward 212 by issuing, distributing, enabling, or a combination thereof for the completion reward 212. For example, the prize module 430 can issue or distribute by sending an electronic coupon, a voucher, a link, a code, or a combination thereof through a text or multi-media message to the first device 102, through an email, or a combination thereof. Also for example, the prize module 430 can enable by changing status or adding digital items to the user's profile or account, or by validating or availing a code, a coupon, a voucher, a link, or a combination thereof.

The prize module 430 can generate the completion reward 212 for a limited group. For example, the prize module 430 can issue or distribute the completion reward 212 for only the activity group 242 or for only the activity team 244 that completed the geocaching objective. The prize module 430 can withhold the completion reward 212 for users not included in the activity group 242 or specific instances of the activity team 244 as specified by the geocache session 410.

It has been discovered that the completion reward 212 based on the external status 232 provides real-time interactions between the entity 214, the organizer of the event 216, the navigation system 100, and the user. The external status 232 can be used to link the various parties and instantaneously provide benefits relevant to the user, such as a certificate or a coupon.

It has been further discovered that the completion reward 212 based on the geocache reservation 252 provides targeted and controlled benefits. The completion reward 212 and the geocache reservation 252 can be used to award benefits to only specific or qualifying users, which can lower costs for the navigation system 100, the entity 214, the organizers of the event 216, or a combination thereof.

The navigation system 100 has been described with module functions or order as an example. The navigation system 100 can partition the modules differently or order the modules differently. For example, the geocaching initiation module 402 and the association module 404 can be a single module. Also for example, the evaluation and the communication functions of the cache update module 428 can each be separated into individual modules.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 of FIG. 1 but outside of the first control unit 316 or the second control unit 338, respectively.

For illustrative purposes, the modules have been described as being implemented with the first device 102, the second device 106, or a combination thereof. However, it is understood that the modules can be implemented differently. For example, the cache update module 428 can be on the first device 102 or the second device 106. Also for example, the evaluation functions of the cache update module 428 can be performed on the first device 102 and the communication functions to other devices can be performed through the second device 106.

The physical transformation from the cache status 222 and the external status 232 results in the movement in the physical world, such as a user looking for the geocache 206 or moving to a different instance of the geocache-location 204. Movement in the physical world results in changes to the current location 240 or the data corresponding to the task completion proof 230, which can be fed back into the system for generating the completion reward 212 or the cache announcement 254.

Figure 5:
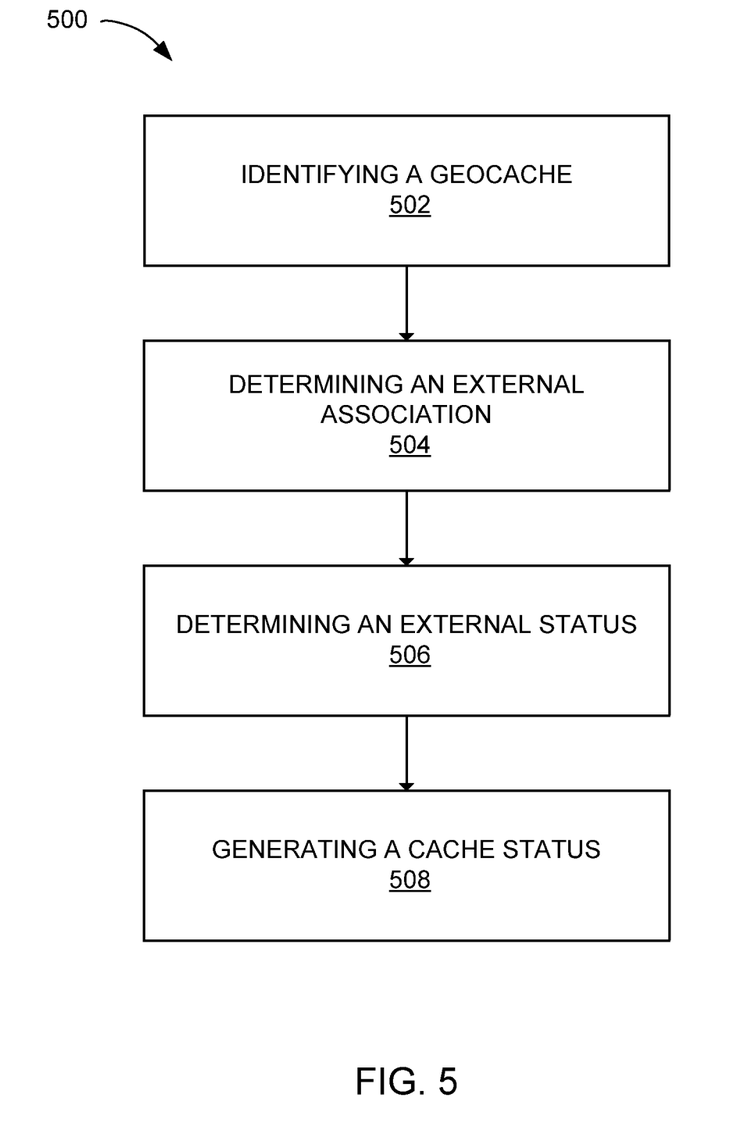
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: identifying a geocache at a geocache-location in a block 502; determining an external association for representing the geocache associated with an entity, an event, or a combination thereof in a block 504; determining an external status for identifying the external status of the entity, the event, or a combination thereof in a block 506; and generating a cache status based on the external status for displaying on a device for displaying on a device in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
identifying a geocache at a geocache-location representing a geographic area where the geocache is hidden, wherein the geocache is for representing a goal or an object of an activity for finding the geocache;
determining a cache schedule coinciding with a shipment schedule:
determining an external association for representing the geocache associated with an entity, an event, or a combination thereof;
determining with one or more processors an external status for identifying one or more states of the entity, the event, or a combination thereof, interacted in real-time, associated with the geocache and the activity;
generating a cache status representing an availability of a completion reward based on the cache schedule, the external status, or a combination thereof wherein the external status includes remaining quantity of prizes for the completion reward;
configuring a control unit including one or more of the processors based on a geocache mode to control a display interface for displaying the cache status; and
controlling a transmission of a communication associated to a progress of the completion reward based on the cache status with the control unit to provide the completion reward instantaneously for displaying on a device.

2. The method as claimed in claim 1 wherein:
determining the cache schedule for temporally controlling the cache status; and
generating the cache status includes generating the cache status based on the cache schedule.

3. The method as claimed in claim 1 wherein:
determining the external association includes determining the external association for representing the geocache associated with the event affiliated with the entity; and
determining the external status includes determining the external status for identifying the external status of the event affiliated with the entity.

4. The method as claimed in claim 1 further comprising:
identifying the geocache mode for accommodating the geocache for an activity group; and
wherein:
generating the cache status includes generating the cache status based on the geocache mode.

5. The method as claimed in claim 1 further comprising:
identifying a geocache reservation for accommodating the geocache for an activity group; and
wherein:
generating the cache status includes generating the cache status based on the geocache reservation for displaying the cache status separately for the activity group.

6. A method of operation of a navigation system comprising:
identifying a geocache at a geocache-location representing a geographic area where the geocache is hidden, wherein the geocache is for representing a goal or an object of an activity for finding the geocache;
determining a cache schedule coinciding with a shipment schedule:
determining an external association for representing the geocache associated with an entity, an event, or a combination thereof;
determining with one or more processors an external status for identifying a state of the entity, the event, or a combination thereof, interacted in real-time, associated with the geocache and the activity;
generating a cache status representing an availability of a completion reward based on Me cache schedule, the external status, or a combination thereof wherein the external status includes remaining quantity of prizes for the completion reward;
configuring a control unit including one or more of the processors based on a geocache mode to control a display interface for displaying the cache status;
generating a completion reward based on the cache status; and
controlling a transmission of a communication associated to a progress of the completion reward based on the cache status with a control unit to provide the completion reward instantaneously for displaying on a device.

7. The method as claimed in claim 6 wherein:
determining the cache schedule for temporally controlling the cache status; and
generating the completion reward includes generating the completion reward based on the cache schedule.

8. The method as claimed in claim 6 further comprising:
identifying a challenge task associated with the geocache;
identifying a task completion proof associated with the challenge task; and
wherein:
generating the completion reward includes generating the completion reward based on the task completion proof.

9. The method as claimed in claim 6 further comprising:
identifying the geocache mode for accommodating the geocache for an activity group; and
generating a cache announcement based on the cache status for notifying only the activity group.

10. The method as claimed in claim 6 further comprising:
identifying a geocache reservation for accommodating the geocache for an activity group; and
wherein:
generating the completion reward includes generating the completion reward based on the geocache reservation for displaying the completion reward only for the activity group.

11. A navigation system comprising:
a control unit including one or more processors configured to:
identify a geocache at a geocache-location representing a geographic area where the geocache is hidden for a geocache session, wherein the geocache is for representing a goal or an object of an activity for finding the geocache;
determining a cache schedule coinciding with a shipment schedule;
determine an external association for representing the geocache associated with an entity, an event, or a combination thereof;
determine an external status for identifying a state of the entity, the event, or a combination thereof, interacted in real-time, associated with the geocache and the activity;
generate a cache status representing an availability of a completion reward based on the cache schedule, the external status, or a combination thereof wherein the external status includes remaining quantity of prizes for the completion reward;

configure the control unit based on a geocache mode to control a display interface for displaying the cache status;

control a transmission of a communication associated to a progress of the completion reward based on the cache status to provide the completion reward instantaneously for displaying on a device; and a memory, coupled to the control unit, configured to store the geocache session.

12. The system as claimed in claim 11 wherein the control unit is configured to:

determine the cache schedule for temporally controlling the cache status; and generate the cache status based on the cache schedule.

13. The system as claimed in claim 11 wherein the control unit is configured to:

determine the external association for representing the geocache associated with the event affiliated with the entity; and determine the external status for identifying the external status of the event affiliated with the entity.

14. The system as claimed in claim 11 wherein the control unit is configured to:

identify the geocache mode for accommodating the geocache for an activity group; and generate the cache status based on the geocache mode.

15. The system as claimed in claim 11 wherein the control unit is configured to:

identify a geocache reservation for accommodating the geocache for an activity group; and generate the cache status based on the geocache reservation for displaying the cache status separately for the activity group.

16. The system as claimed in claim 11 wherein the control unit is configured to generate the completion reward based on the cache status for displaying on the device.

17. The system as claimed in claim 16 wherein the control unit is configured to:

determine the cache schedule for temporally controlling the cache status; and generate the completion reward based on the cache schedule.

18. The system as claimed in claim 16 wherein the control unit is configured to:

identify a challenge task associated with the geocache;

identify a task completion proof associated with the challenge task; and generate the completion reward based on the task completion proof.

19. The system as claimed in claim 16 wherein the control unit is configured to:

accommodate the geocache for an activity group;

generate a cache announcement based on the cache status for notifying only the activity group.

20. The system as claimed in claim 16 wherein the control unit is configured to:

identify a geocache reservation for accommodating the geocache for an activity group; and generate the completion reward based on the geocache reservation for displaying the completion reward only for the activity group.

\* \* \* \* \*